(12) United States Patent
Kollep

(10) Patent No.: US 6,880,454 B2
(45) Date of Patent: Apr. 19, 2005

(54) CAPSULE CAGE

(75) Inventor: Alexandre Kollep, Lutry (CH)

(73) Assignee: Nestec S.A., Vevey (CH)

(*) Notice: Subject to any disclaimer, the term of this patent is extended or adjusted under 35 U.S.C. 154(b) by 0 days.

(21) Appl. No.: 10/328,774

(22) Filed: Dec. 24, 2002

(65) Prior Publication Data
US 2003/0116029 A1 Jun. 26, 2003

Related U.S. Application Data

(63) Continuation of application No. PCT/EP01/07173, filed on Jun. 25, 2001.

(30) Foreign Application Priority Data

Jun. 30, 2000 (EP) .............................. 00113879

(51) Int. Cl.$^7$ ................................. A47J 31/00
(52) U.S. Cl. ....................... 99/295; 99/302 R
(58) Field of Search .............................. 99/295, 302 R, 99/307, 279

(56) References Cited

U.S. PATENT DOCUMENTS

| 2,899,886 A | * | 8/1959 | Rodth | 99/295 |
| 2,968,560 A | * | 1/1961 | Goros | 99/295 |
| 3,470,812 A | * | 10/1969 | Levinson | 99/295 |
| 3,878,772 A | * | 4/1975 | Nordskog | 99/295 |

* cited by examiner

Primary Examiner—Reginald L. Alexander
(74) Attorney, Agent, or Firm—Winston & Strawn LLP

(57) ABSTRACT

The present invention relates to a capsule cage (1) which can be fitted in a coffee machine, having a water intake channel (4) and a housing (5) for the capsule to be extracted, and, directly at the outlet of the water intake channel and in the housing, a system (6) which pierces the capsule, is independent of the water intake channel and is formed by at least one blade. The blade has two side edges (22, 23) and a cutting edge, one of the two side edges of the blade having a direction substantially parallel to the direction of piercing A of the capsule to be extracted.

23 Claims, 5 Drawing Sheets

CAPSULE CAGE

CROSS REFERENCE TO RELATED APPLICATION

This is a continuation of the U.S. National phase designation of International Application PCT/EP01/07173, filed Jun. 25, 2001, the contents of which are hereby incorporated herein by reference thereto.

FIELD OF THE INVENTION

The present invention relates to a capsule cage which can be fitted in a coffee machine, comprising a water intake channel and a housing for the capsule to be extracted.

BACKGROUND OF THE INVENTION

Systems already exist for extracting capsules or cartridges, said systems comprising a housing for the cartridge to be extracted and a needle, for example the systems forming the subject of patent CH 605,293 and U.S. Pat. No. 4,846,052. In this system, the needle has a dual function. On the one hand, it allows the upper part of the capsule to be opened and, on the other hand, it forms the water intake channel. The disadvantage of this device is that the injection needle can become blocked up over the course of time, on the one hand by the chalk in the water and on the other hand by the coffee grounds. A second disadvantage is that the injection needle makes quite a large hole in the upper part of the cartridge, which means that at the moment when the extracted cartridge is released there is a large discharge of coffee grounds, which soils the system.

U.S. Pat. No. 3,260,190 also relates to a device for extracting closed capsules, in which device the top and the bottom of the capsule are pierced by blades. The problem with this system is that, at the moment of piercing, the blades deform the capsules presently available on the market, for example those forming the subject of U.S. Pat. No. 5,897,899, and this does not afford a good perforation, especially as regards cleanness at the end of extraction. Moreover, U.S. Pat. No. 5,649,472 also mentions the possibility of carrying out extraction using bevelled cylindrical points. In this case, the problem is that circular openings are created which are too large, and this is detrimental in respect of cleanness of extraction.

SUMMARY OF THE INVENTION

The invention relates to capsule-cage of a beverage machine. A preferred embodiment of the cage, a piercing member, and a housing that is configured for housing a capsule. The piercing member includes at least one blade that is configured for piercing an elongated slit into the capsule in the housing. The slit produced in the capsule preferably has a length to width ratio of about between 2 and 8, and can be substantially rectangular. A fluid conduit of the cage defines an intake channel in fluid communication with the housing and is configured for feeding an extraction fluid, such as water, into the slits in the capsule.

The preferred cage includes a plurality of the blades, which are disposed equidistantly from each other around a blade axis. The piercing member can be rotatable around the blade axis and can include a base mounting the blades to the housing. The base preferably includes a fluid opening in fluid communication with the intake channel for feeding the fluid into the housing and pierced capsule. Additionally, the plurality of blades can be disposed around the fluid opening.

Preferably, the fluid channel has a fluid opening in the housing that is separate from the blade. The fluid channel is preferably disposed independent from the blade.

A connection member, which can include a threaded member disposed coaxially with the inlet channel, is configured for connecting the housing to a beverage dispensing machine. The connection member preferably has a spherical member to connect with the beverage dispensing machine so that the cage is spherically movable with respect thereto to improve leaktightness. The preferred housing has a dynamic seal configured to seal the housing when closed around the capsule.

In the preferred embodiment, the blade and housing are configured such that the blade pierces the capsule upon movement relative thereto in a piercing direction, and the blade has an elongated cross-section measured perpendicular to the piercing direction. A side edge of the blade extends substantially parallel to the piercing direction. The blade cross-section in this embodiment is substantially rectangular, and the blade cross-section has a length to width ratio of about between 2 and 8. Preferably, the blade has a cutting edge facing generally in the piercing direction and having a surface disposed at an angle of about between 30° and 60° from the piercing direction for cutting the slit.

BRIEF DESCRIPTION OF THE DRAWINGS

In the remainder of the description, reference is made to the drawings in which.

DETAILED DESCRIPTION OF THE PREFERRED EMBODIMENTS

Figure 1:
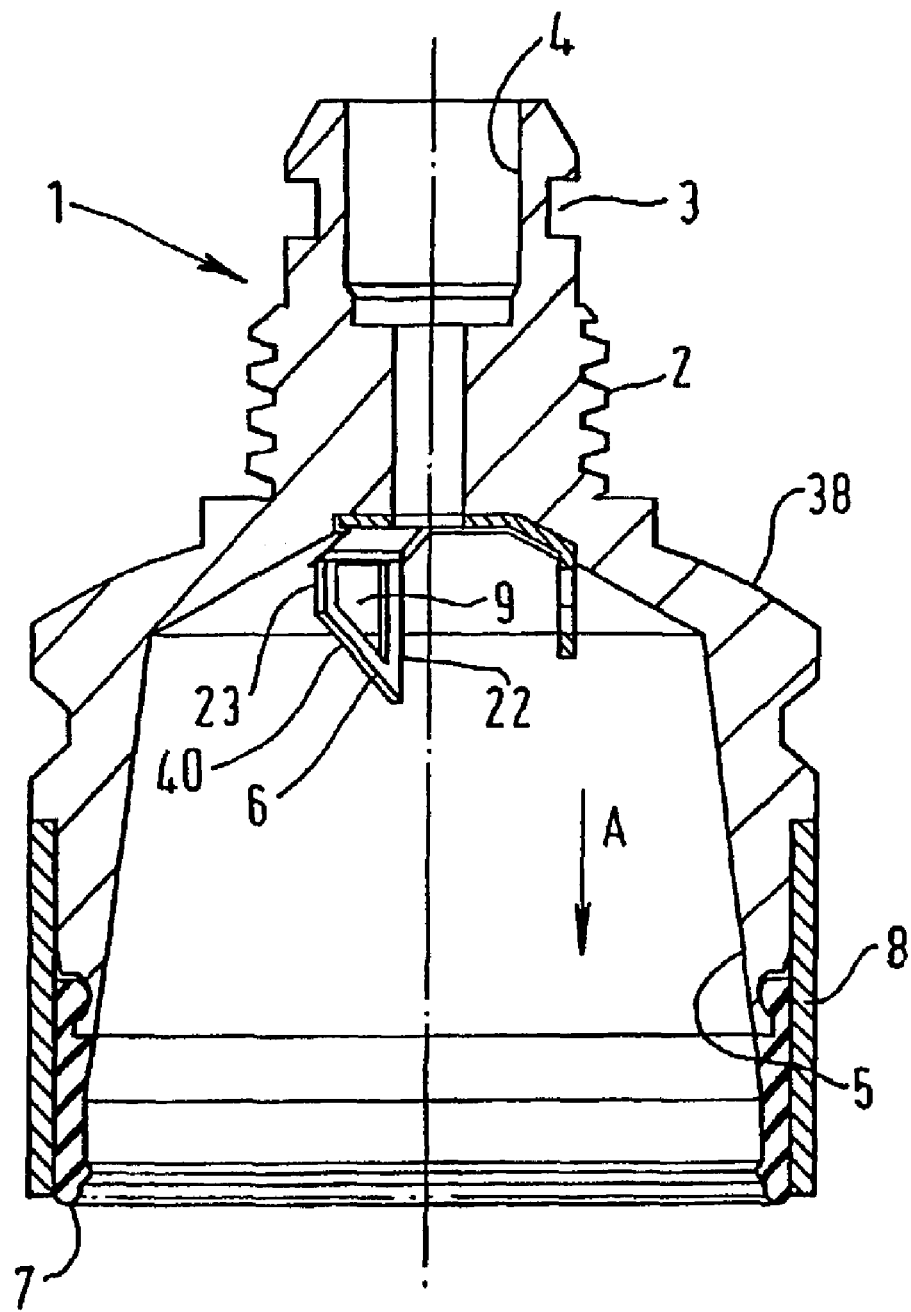
FIG. 1 is a partial sectional view of the capsule cage according to the invention.

The present invention makes available a capsule cage in which there is practically no risk of blockage and with which it is possible to release the used capsule while at the same time limiting the escape of coffee grounds into the coffee machine.

The present invention relates to a capsule cage which can be fitted in a coffee machine, comprising a water intake channel, a housing for the capsule to be extracted, and, directly at the outlet of the water intake channel and in the housing, a system which pierces the capsule, is independent of the water intake channel and is formed by at least one blade, said blade comprising two side edges and a cutting edge, one of the two side edges of the blade having a direction substantially parallel to the direction of piercing of the capsule to be extracted.

In a preferred embodiment, the capsule cage comprises a thread for fixing it on the coffee machine. The piercing system formed by at least one blade is oriented in a direction parallel to the axis of the water intake channel.

In a preferred embodiment, the two side edges of each blade are parallel.

It is possible, according to the invention, either for the cage to be fixed and for the capsule to be introduced into said cage or, conversely, for the cage to be movable and the capsule fixed, in which case the cage is set in movement and traps the capsule to be extracted. Direction of piercing is understood to mean either the direction of engagement of the capsule in the housing, or the direction of displacement of the capsule cage just before piercing of the capsule.

The configuration of the blades means that it is possible to make small slits or larger slits in the capsule to be extracted. The shape of the slits is not square, but instead substantially rectangular: the length-to-width ratio of said slits or said blades is between 2 and 8.

The type of capsules or cartridges which it is conceivable to use according to the invention are sealed capsules or cartridges which open under the effect of pressure, for example the capsules forming the subject of the U.S. Pat. No. 5,897,899 and also the capsules forming the subject of Publications WO 02/26588 A1 and EP 00120936.0.

The type of coffee machine on which the capsule cage according to the invention can be fitted can also be a machine with a cartridge holder into which the capsule is introduced, such as the machine forming the subject of the U.S. Pat. No. 5,897,899, or a machine with a jaw comprising a movable capsule cage, such as that forming the subject of U.S. Publication No. 2002/0121198 A1 in the name of the Applicant. These all concern extraction of closed capsules, where the extraction is carried out at a pressure of between 2 and 15 bar.

The piercing system normally comprises more than one blade, for example two, three, four, five, or six blades. It is preferable for the piercing system to comprise three blades. These are equidistant.

In the piercing system, the blades are openworked with parallel side edges. It is also possible for them not to be openworked. They have a cutting edge forming an angle of between 30 and 60° with the side edges.

The piercing system can be fixed in the housing for the capsule. This arrangement is suitable for the abovementioned machine forming the subject of U.S. Publication No. 2002/0121198 A1. The piercing system can also be movable in rotation about the axis of the water intake channel. This arrangement is suitable for the machine forming the subject of U.S. Pat. No. 5,897,899.

The material used for the blades is important. It is preferable to have blades which have good resistance to piercing of aluminium capsules. The blades are thus preferably made of metal (iron, brass, chromium-plated brass) or of steel, preferably stainless steel. They are preferably made by stamping and folding, which makes them easy and inexpensive to produce and they have a service life equivalent to the service life of the machine on which they are fitted.

To guarantee good leaktightness, it is important that the lower part of the housing for the capsule to be extracted should comprise a dynamic seal, that is to say a seal having a certain flexibility. This seal is made of any plastic. This seal is preferably made of an elastomer.

The size of the capsules to be extracted is normally of the order of 30 mm. It is therefore necessary for the blades to have corresponding sizes. The blades have a length of between 5 and 15 mm, a width of between 2 and 8 mm, and a thickness of between 0.2 and 1 mm. It is preferable to use blades which are not openworked.

The setting of the capsule cage according to the invention in the coffee machine is not critical. It is equally possible to provide for the water to arrive from above or from below, or any other possibility.

The present invention finally relates to a method of extracting a capsule closed in the capsule cage as described above, in which method the capsule is extracted in a direction of piercing substantially parallel to one of the side edges of the piercing blades. The piercing is carried out to obtain a slit for the intake of water. This slit has a ratio of its two dimensions, namely length to width, of greater than 1, and this ratio is preferably between 2 and 8.

The capsule cage (1) has a thread (2) so that it can be screwed onto the coffee machine. The housing (3) is used in order to arrange a seal in it to permit good leaktightness of the system. The channel (4) permits intake of water into the housing (5) for the capsule. Arranged directly at the outlet of the channel (4) is the piercing system (6) consisting of 3 openworked blades. In this figure, the piercing system is fixed. The bottom of the housing (5) comprises a dynamic seal (7) of elastomer. The outer part of the housing (5) is made of rigid metal. The principal characteristic of the extraction system according to the invention is that instead of making a hole, slits are made in the top of the capsule to be extracted. The apertures (9) permit a good passage of water into the capsule. The spherical ball (38) on the outside of the capsule housing has a function which will be explained below. The arrow A shows the direction of piercing which is parallel to the side edges (22, 23) of the piercing blades (6). The cutting edge of the blades is represented by reference number (40).

Figure 2:
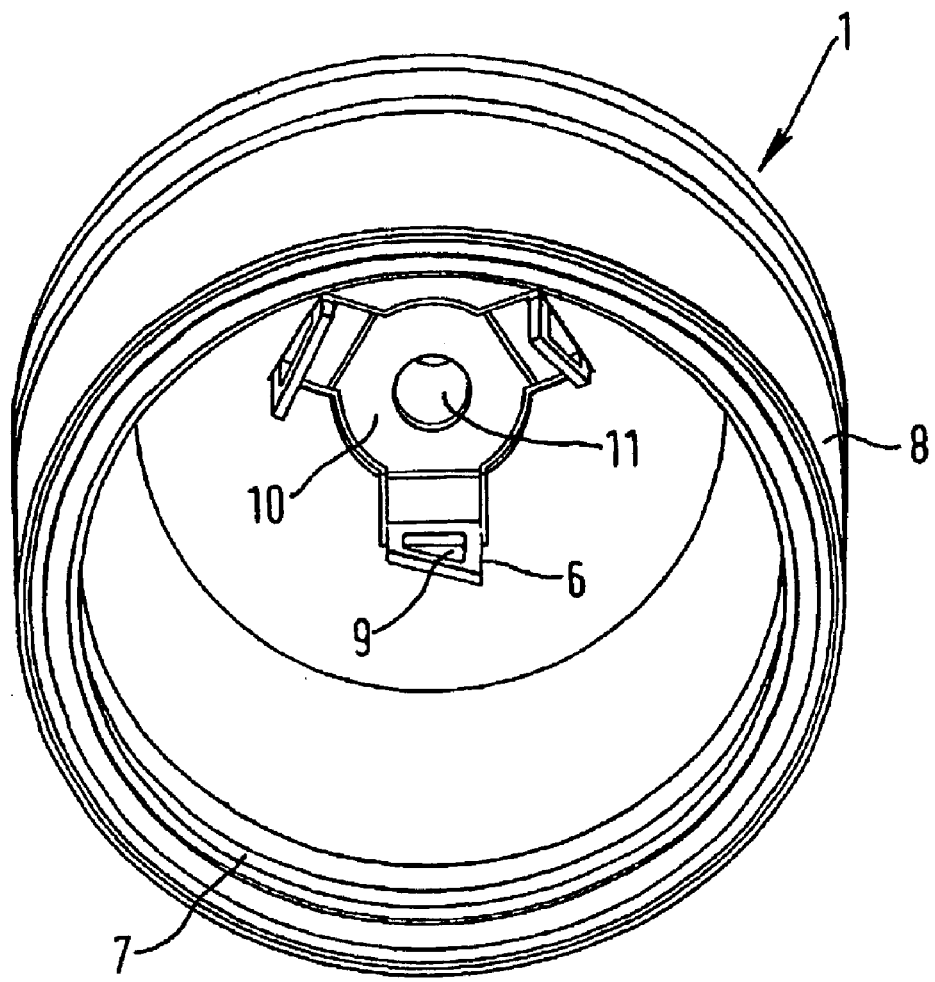
FIG. 2 is a perspective view of the cage in FIG. 1 from underneath.

FIG. 2 is closely related to FIG. 1 and clearly shows the piercing system comprising the base ring (10), with its central opening (11) which permits intake of water, and the 3 openworked blades (6).

Figure 3:
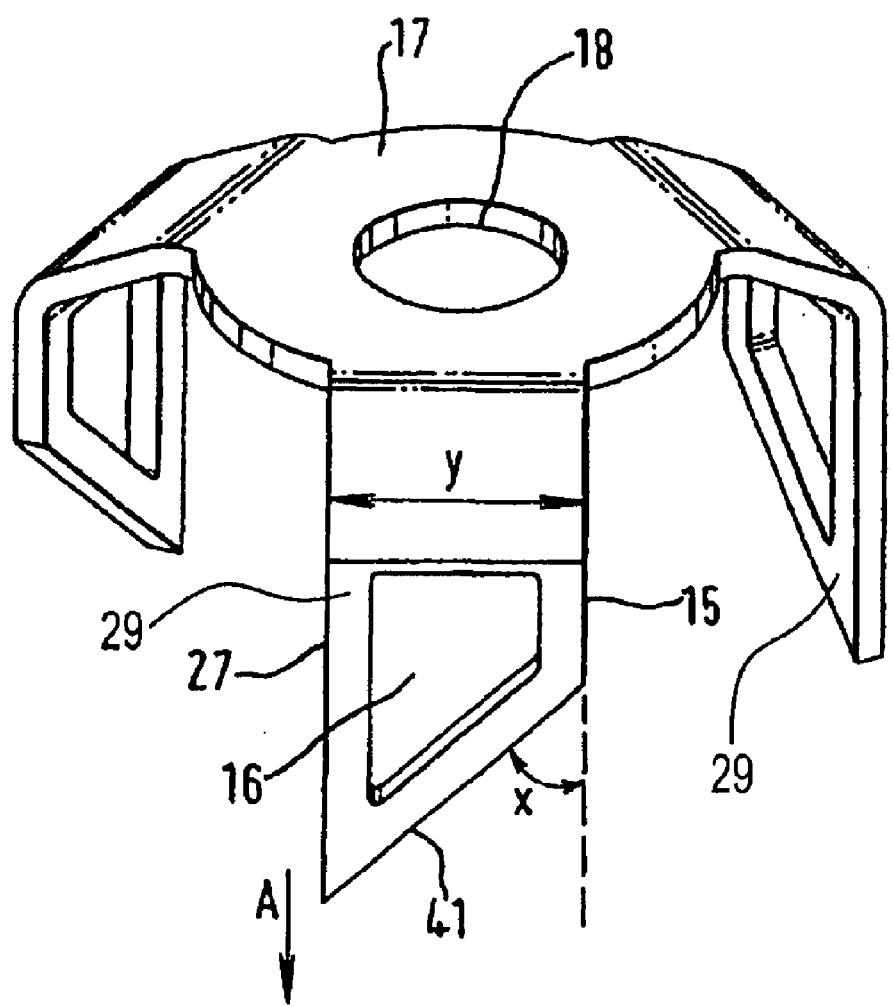
FIG. 3 is a perspective representation of the piercing system according to a first embodiment.

FIG. 3 shows a piercing system with blades (15) which have apertures (16). Here too there is a ring (17) with a central opening (18). The cutting edge (41) of the blade forms an angle x of between 30 and 60°. In this case, the length of the cut in the capsule is not greater than the width y of the blade. In the present case, the angle x is 45°. The piercing direction A parallel to the side edge (27) of the blade (15) is also clearly shown. The blades (15) have major sides (29), which in the embodiment shown are flat and disposed of opposite sides of the blade (15) and adjacent the cutting edge (41). The apertures (16) extend from one major side (29) to the other, and the major sides (29) preferably extend substantially parallel to the direction in which the blades (15) move with respect to the capsule for piercing.

Figure 4:
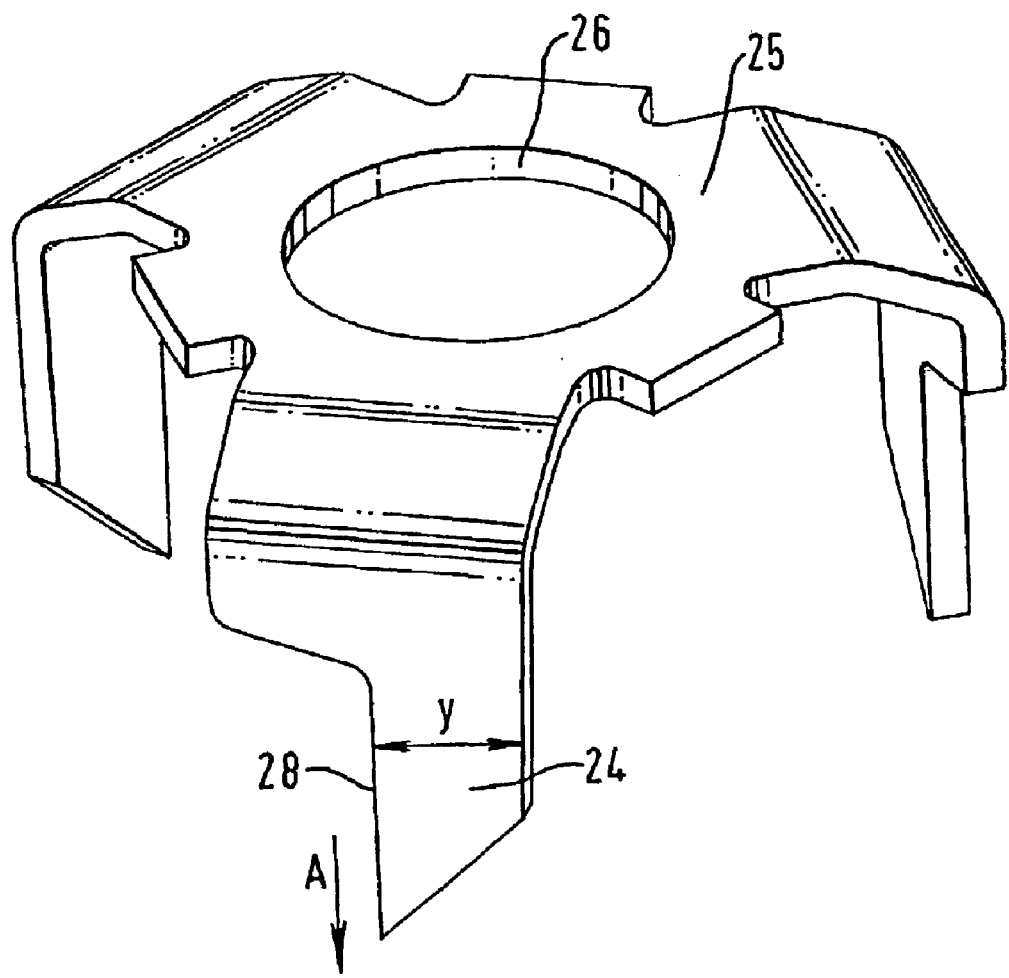
FIG. 4 is a perspective representation of the piercing system according to a second embodiment.

FIG. 4 shows a piercing system with blades (24). Here too there is a ring (25) with a central opening (26). The angle of the cutting edge of the blades is 45°. In this case, the width of the cut in the capsule is not greater than the width y of the blade. Blades with y of the order of 2 mm, a blade length of 4 to 5 mm and a thickness of 0.5 mm are advantageous. This gives the slit a length-to-width ratio of the order of 4. The direction of piercing A parallel to the side edge (28) of the blade (24) is also clearly shown.

Figure 5:
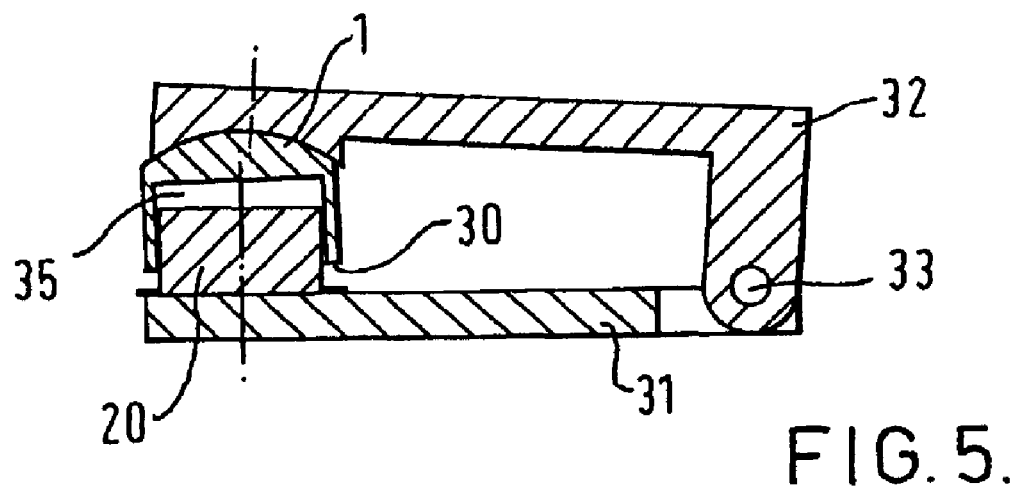
FIGS. 5 and 6 are partial sectional views showing the capsule cage in a machine according to U.S. Publication No. 2002/0121198 A1.
Figure 6:
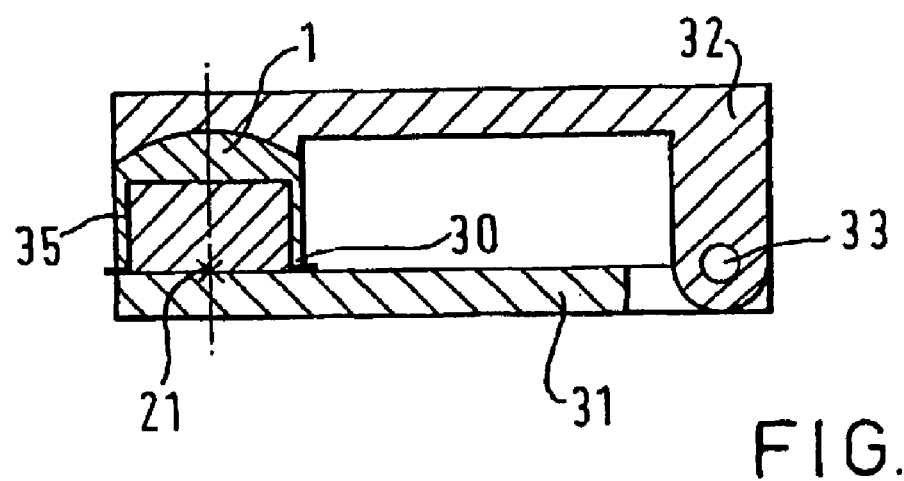

FIGS. 5 and 6 show in diagrammatic form the capsule cage (1) in a coffee machine of the type according to U.S. Publication No. 2002/0121198 A1. The machine comprises a fixed part (31) and a movable part (32), the movable part being fitted so as to rotate on the axis (33). The capsule cage is in particular represented so as to show clearly the spherical ball (38) from FIG. 1. This ball serves to ensure a certain degree of spherical mobility of the capsule cage in order to compensate for certain anomalies which could lead to a defect in the leaktightness of the system. The movable part (32) comprises a housing (35) with a lower peripheral border (30). The capsule to be extracted is represented as (20). The housing (35) is movable on the spherical ball (38), the centre (21) of which is substantially at the centre of the housing (21). When the piece (32) is closed, the housing (35) can move along the contours of the capsule (20) and the border (30), that is to say the dynamic seal (7) in FIG. 1 adapts so as to bear firmly against the shoulder of the fixed part (31). When the part (32) is closed, the blades pierce the top of the capsule (20) and the hot water can flow in and extract said capsule. It is necessary in this case to provide raised and recessed elements under the lower part of the capsule, as in U.S. Pat. No. 5,826,492.

The device works in the following way. The capsule to be extracted is placed in the device according to U.S. Publication No. 20020121198 A1 and the capsule cage is moved towards the capsule to be extracted. The piercing blades perform their function, that is to say they pierce the top of the capsule. The hot water arrives and passes through the bed of coffee via the openings made by the blades. As a result of a rise in pressure in the capsule, the lower membrane of the capsule will bear on the raised and recessed elements according to U.S. Pat. No. 5,826,492 and the capsule opens and the coffee flows into the cup placed under the capsule cage.

What is claimed is:

1. A beverage-machine capsule-cage, comprising:
   a housing configured for housing a capsule;
   a piercing member comprising at least one blade that is configured for piercing an elongated slit into the capsule in the housing with a length to width ratio of at least about 2; and
   a fluid conduit defining an intake channel in fluid communication with the housing and configured for feeding an extraction fluid into the slits in the capsule.

2. The capsule cage of claim 1, wherein the elongated slit has a length to width ratio of up to about 8.

3. The capsule cage of claim 2, wherein the slit is substantially rectangular.

4. The capsule cage of claim 1, wherein the blade and housing are configured such that the blade pierces the capsule upon movement relative thereto in a piercing direction, and the blade has an elongated cross-section measured perpendicular to the piercing direction.

5. The capsule cage of claim 1, wherein the blade comprises a plurality of blades.

6. The capsule cage of claim 5, wherein the blades are disposed equidistantly from each other around a blade axis.

7. The capsule cage of claim 6, wherein the piercing member is rotatable around the blade axis.

8. The capsule cage of claim 1, wherein the piercing member comprises a base mounting the blade to the housing, the base including a fluid opening in fluid communication with the intake channel for feeding the fluid into the housing and pierced capsule.

9. The capsule cage of claim 8, wherein the blade comprises a plurality of blades disposed around the fluid opening.

10. The capsule cage of claim 1, wherein the fluid channel has a fluid opening in the housing separate from the blade.

11. The capsule cage of claim 10, wherein the fluid channel is disposed independent from the blade.

12. The capsule cage of claim 1, further comprising a connection member configured for connecting the housing to a beverage dispensing machine.

13. The capsule cage of claim 12, wherein the connection member comprises a spherical member to connect with the beverage dispensing machine so that the cage is spherically movable with respect thereto to improve leaktightness.

14. The capsule cage of claim 1, wherein the housing comprises a dynamic seal to seal the housing when closed around the capsule.

15. The capsule cage of claim 1, wherein the blade and housing are configured such that the blade pierces the capsule upon movement relative thereto in a piercing direction, the blade having:
   a cutting edge disposed forwardly in the piercing direction and configured for cutting the slit; and
   and a first major side adjacent the cutting edge and oriented substantially parallel to the piercing direction.

16. The capsule cage of claim 15, wherein the blade comprises a second major side adjacent the cutting edge and oriented substantially parallel to the piercing direction.

17. The capsule cage of claim 16, wherein the blade has a side edge extending substantially parallel to the piercing direction.

18. The capsule cage of claim 16, wherein the blade defines an aperture extending between the first and second major sides.

19. A beverage-machine capsule-cage, comprising:
   a housing configured for housing a capsule;
   a piercing member comprising at least one blade that is configured for piercing an elongated slit having substantially parallel sides into the capsule in the housing, wherein the blade and housing are configured such that the blade pierces the capsule upon movement relative thereto in a piercing direction, and the blade has an elongated cross-section measured perpendicular to the piercing direction; and
   a fluid conduit defining an intake channel in fluid communication with the housing and configured for feeding an extraction fluid into the slit in the capsule.

20. The capsule cage of claim 15, wherein the blade cross-section is substantially rectangular.

21. The capsule cage of claim 19, wherein the blade cross-section has a length to width ratio of about between 2 and 8.

22. The capsule cage of claim 19, wherein the blade has a cutting edge facing generally in the piercing direction and having a surface disposed at an angle of about between 30° and 60° from the piercing direction for cutting the slit.

23. The capsule cage of claim 19, wherein the blade comprises:
   a cutting edge disposed forwardly in the piercing direction and configured for cutting the slit; and
   a first major side adjacent the cutting edge and oriented substantially parallel to the piercing direction.

* * * * *